No. 871,311. PATENTED NOV. 19, 1907.
E. V. WILLIAMS.
CALCULATOR FOR TYPE WRITING MACHINES.
APPLICATION FILED FEB. 20, 1906.

Witnesses

Inventor
Elmer V. Williams
By
Attorney

Fig. 2.

No. 871,311. PATENTED NOV. 19, 1907.
E. V. WILLIAMS.
CALCULATOR FOR TYPE WRITING MACHINES.
APPLICATION FILED FEB. 20, 1906.

No. 871,311. PATENTED NOV. 19, 1907.
E. V. WILLIAMS.
CALCULATOR FOR TYPE WRITING MACHINES.
APPLICATION FILED FEB. 20, 1906.

Inventor
Elmer V. Williams
By
Attorney

Witnesses

No. 871,311. PATENTED NOV. 19, 1907.
E. V. WILLIAMS.
CALCULATOR FOR TYPE WRITING MACHINES.
APPLICATION FILED FEB. 20, 1906.

UNITED STATES PATENT OFFICE.

ELMER V. WILLIAMS, OF SAN PEDRO, CALIFORNIA, ASSIGNOR OF ONE-HALF TO LUKE KELLY, OF SAN PEDRO, CALIFORNIA.

CALCULATOR FOR TYPE-WRITING MACHINES.

No. 871,311.  Specification of Letters Patent.  Patented Nov. 19, 1907.

Application filed February 20, 1906. Serial No. 302,121.

*To all whom it may concern:*

Be it known that I, ELMER V. WILLIAMS, of San Pedro, in the county of Los Angeles and State of California, have invented certain new and useful Improvements in Calculators for Type-Writing Machines; and I do hereby declare the following to be a full, clear, and exact description of the invention, such as will enable others skilled in the art to which it appertains to make and use the same.

The primary object of this invention is to provide a calculator capable of being attached to standard makes of typewriters and by which addition or subtraction may be worked either in vertical lines or in horizontal lines. And further objects are to provide an attachment of this kind which will not interfere with the ordinary work of the typewriting machine; which will require but little, if any, additional pressure in the operation of the keys; and which will also permit of the use, when desired, of the numeral keys of the typewriter without actuating the calculator.

The invention will be hereinafter fully set forth and particularly pointed out in the claims.

In the accompanying drawings, Fig. 13ª is a detached view thereof.

Referring to the drawings, 1 designates, in general outline, the frame of a typewriter of the Remington style. To one side of this frame is secured a triangular frame 2 composed of an upper guide rod and two lower guide rods against and upon which move rollers 3 on the outside of a calculator 4. This calculator is connected by an arm 5 to the traveling carriage of the typewriter so as to move back and forth on frame 2 in unison with the movements of the carriage. The connection of this arm to the carriage is adjustable so that the position of the calculator relative to the latter may be readily changed. This is effected by screws $5^a$ passed through slots $5^b$. Arm 5 is shown as equipped in its upper face with grooves 6 with which engages a screw 7 mounted in a bracket $7^a$ on the calculator casing. Hence while the arm may be moved independently of the carriage, the calculator may be adjusted on the arm.

Figure 1:
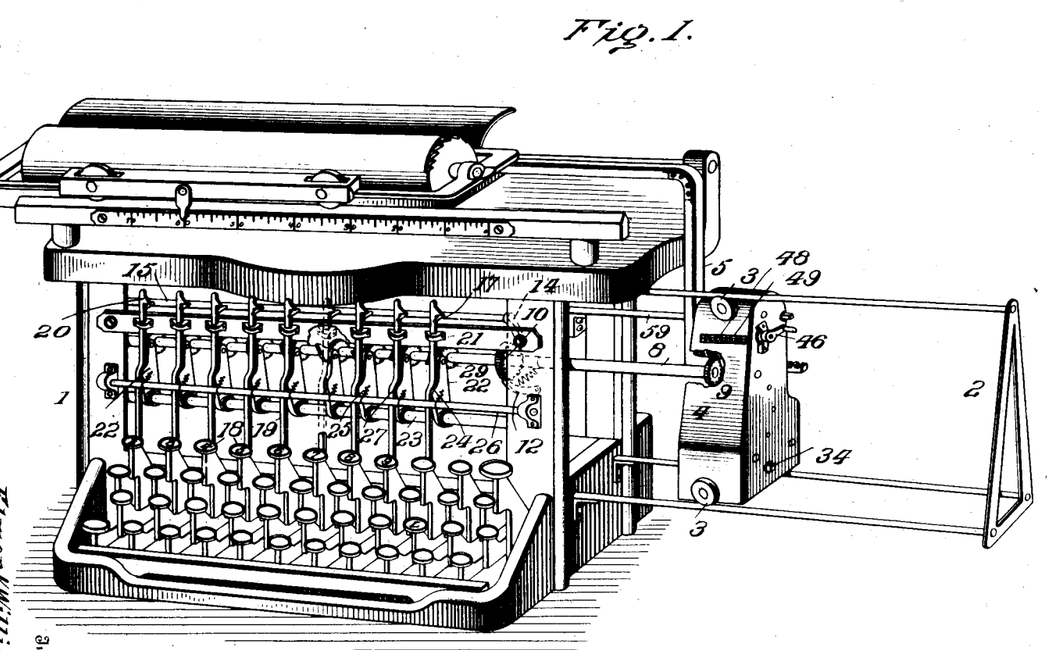
Figure 1 is a view in perspective of a typewriting machine equipped with my improvements.
Figure 12:
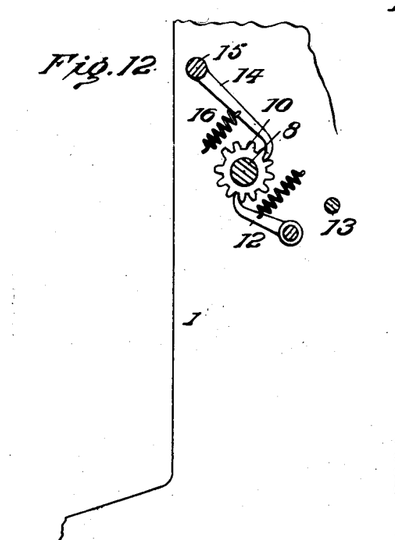
Fig. 12 is a similar view of the locking means for the latter.

8 designates what I term the controller shaft. It is normally held locked, and its release is necessary in order to allow of the operation of any one of the several trains of gearing of the calculator. This shaft is mounted horizontally in the frame of the typewriter, and carries a gear-wheel 9 which is shown in Fig. 1 as being at its outer end. Also on this shaft is a small gear-wheel 10 just inside one of the end uprights of the typewriter frame, and when the calculator is not to be actuated this gear wheel is engaged by a spring-held pawl 12, which locks the shaft 8. But when the calculator is in use, pawl 12 is turned to one side against a stop 13, as shown in Fig. 12, being held in both positions by the same spring. This gear-wheel is also engaged by a pawl 14 extending from a rock shaft 15 located above and parallel with shaft 8. The partial rotation of shaft 15 will raise pawl 14 out of engagement with wheel 10 as against the tension of spring 16. This will occur each time one of the numeral keys is depressed, but if wheel 10 be also engaged by pawl 12 such movement of the numeral key, although it will raise pawl 15, will not permit shaft 8 to rotate. Otherwise, if pawl 12 be out of engagement, shaft 8 will be free to revolve when pawl 15 is actuated. From this shaft 15 project a series of short arms 17 (nine in number), being in about the same vertical plane as the numeral keys of the typewriter.

Figure 11:
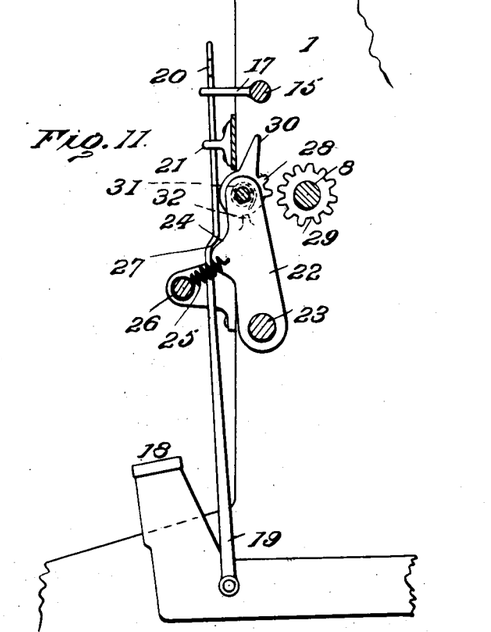
Fig. 11 is a side view of the means actuated by a typewriter key for regulating the revolution of the controller shaft.

In Fig. 11, I have shown one of these keys at 18 and as having secured thereto near its front end a vertically disposed rod 19 from the upper end of which projects a lateral lug 20 designed to engage one of the arms 17 when the key is depressed. Each rod 19 is passed through a guide loop 21. Immediately adjacent these rods 19 are vertically-disposed pivoted arms 22 mounted on a cross rod 23 having its bearings in the typewriter frame. Each of these arms has a front bulged portion 24 which is normally held against rod 19 by a spring 25, secured to a cross rod 26, mounted similarly to rod 23. The vertical rods 19, immediately above these bulged portions of arms 22, are bent to form angular shoulders 27 which are designed to bear inwardly on such bulged portions when the numeral keys are depressed. In this way, the arms 22 are caused to partly turn on their pivots as against the tensions of springs 25. When the arms are so turned segmental toothed wheels 28 mounted on the upper ends of such arms are caused to engage gear-wheels 29 fast on shaft 8, there being one gear wheel corresponding to each segmental wheel and hence to the nine numeral keys.

Each of the wheels 28 carries a different number of gear teeth, corresponding to the numeral of its respective key, and it also has an elongated tooth 30, which I denominate a stop tooth, since when it contacts with the respective wheel 29 the revolution of shaft 8 is arrested. Each of the wheels 28 is returned to its normal position by a coil spring 31 (see Fig. 11) as soon as pressure is released from the type key and the wheel-carrying arm 22 resumes its normal position under the action of its spring 25. A stop lug 32 projecting from each arm in the plane of a shoulder of each wheel 28 arrests the movement of the latter under the recoil of its spring. At the same time that one of the wheels 28 is thrown into engagement with its respective wheel 29, the lug 17 of the depressed rod 19 by acting on the respective arm 17 turns shaft 15 sufficiently to raise the holding pawl 14 out of engagement with wheel 10, and the pawl 12 being previously thrown out of engagement, the controller shaft 8 is released and is free to revolve with the gearing of the calculator, the latter as well as the shaft being arrested only when the stop tooth 30 of the actuated wheel 28 engages the respective gear wheel 29. When the revolution of the controller shaft ceases, and pressure on the numeral key is released, the pawl 14 drops back into engagement with gear wheel 10, and holds the mechanism ready for the next operation.

The calculator 4 may be of any desired capacity, but, for all ordinary purposes, one having nine or ten sets of digit wheels and trains of gearing is sufficient. Briefly stated, each digit wheel has its own separate train of spring-actuated gearing, the several spring motors being wound from a common point. The release of the train of gearing of any one of the digit wheels is dependent upon, first, the tripping of an escapement, and, secondly, the release of the controller shaft 8, the gear of which is at the same time in mesh with one of the wheels of such train. Simultaneous with the release of such shaft, by the disengagement of pawl 14 from wheel 10, the train of gearing with which the gear-wheel 9 is in engagement is free to be actuated by its respective spring motor, the arrest thereof being effected simultaneously with the arrest of shaft 8. The calculator being adjusted in proper relation to the carriage of the typewriter, according to the point at which the first number is to be printed, the calculator as it moves on frame 2 will, at the proper point, extend over the end of shaft 8, and the wheel 9 thereof will be in line to be engaged by one wheel of each train of gearing. This will be better understood by reference to Fig. 2, which shows a single train of gearing of a single column. This, together with others of substantially identical construction, makes up the entire gear mechanism of the calculator. Each train is driven by its own spring motor 33, the spring whereof is preferably of the barrel type. The springs of the several motors will be wound by a single winding device 34. Some of the teeth of the gear wheels 35 of each motor are omitted, as at 36, so as to make it possible for the one winding device to wind the springs of all the trains of gearing equally and together, and without danger of injury to those whose springs have not been unwound to the same extent as have the springs of other trains. To economize in space the several spring motors are arranged in staggered relation to one another, that of a second train of gearing being indicated at 37, Fig. 2.

Figure 18:
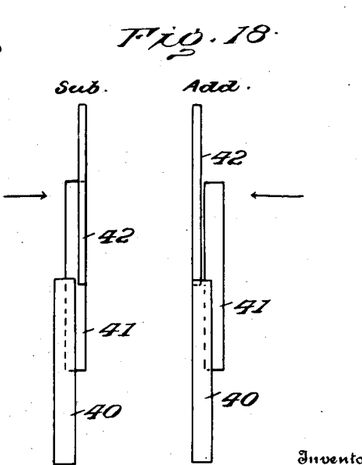
Fig. 18 shows edge views of two intermeshing wheels and the shiftable wheels for engaging therewith.

38, 38ª and 39 are intermediate gears actuated by a spring motor. The gear 39 meshes with a gear-wheel 40, which in turn meshes with a gear-wheel 41. It is with wheel 40 that the gear 9 of controller shaft 8 intermeshes, that is to say, the gear-wheel 40 of each train of gearing is capable of sliding engagement with the controller gear. The gear-wheels 40 and 41 are of corresponding diameters and thickness, but are not on exactly the same plane, (see Fig. 18) so that they do not mesh throughout their full width. This is to enable the digit controlling wheels 42, which are thinner, to be placed in engagement either with the wheels 40 or the wheels 41, according as the machine is set to perform addition or subtraction. For adding, wheels 42 engage with wheels 40, while for subtraction the engagement is with wheels 41.

The digit controlling wheels 42 are mounted on a longitudinally movable shaft 43, the movements whereof effect the shifting of wheels 42 from engagement with wheels 40 to engagement with 41, or the reverse. I have shown shaft 43 as having on its projecting end an eccentric groove 44 to receive a stud 45 of a concentrically mounted crank handle 46 fitted by plates 47 to one side of the calculator. Although as a matter of fact the numbers could be placed on wheels 42, yet for the purpose of throwing the digits forward, nearer to the operator, I provide a second and corresponding set of digit wheels 48, the numbers whereon are visible through a slot 49 formed in the calculator casing. These supplementary wheels 48 are mounted on a shaft 50 and are movable longitudinally of their axes synchronously with wheels 42, arms 51 carried by shaft 43 being extended against the end digit wheels 48, so that the latter will travel bodily when the wheels 42 are shifted.

Figure 2:
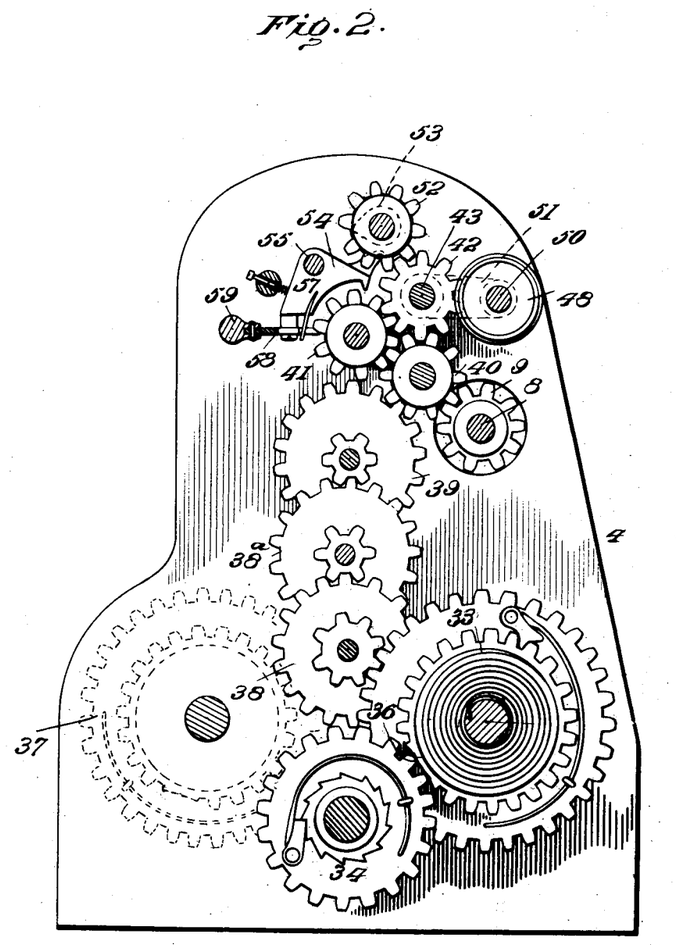
Fig. 2 is a side elevation of one of the calculators, with its side plate removed.
Figure 3:
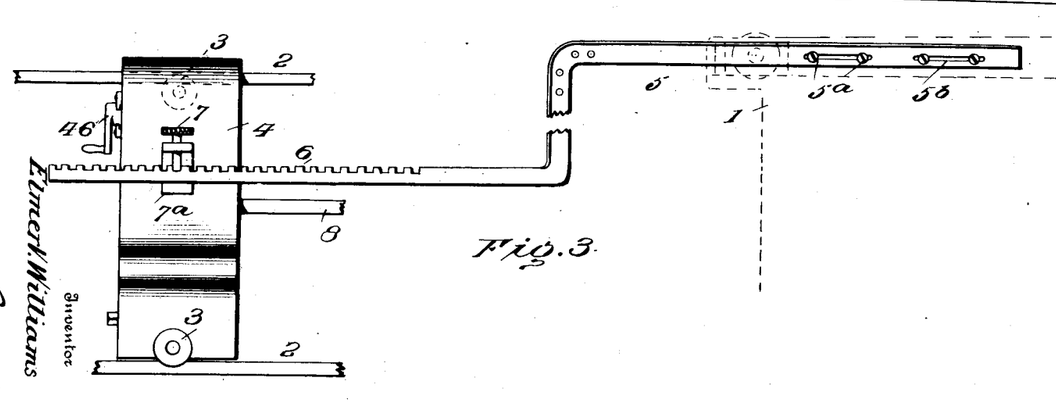
Fig. 3 is an enlarged view showing the connection between a calculator arm and the typewriter carriage.
Figure 17:
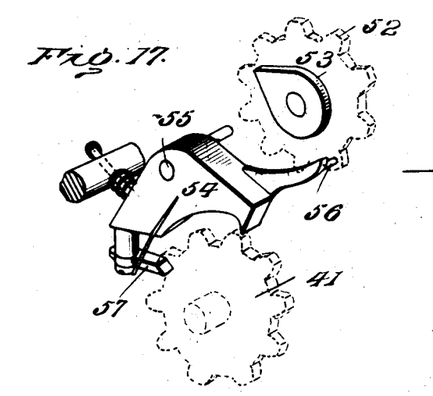
Fig. 17 shows one of the escapement pawls.

52 designates gear-wheels mounted above and actuated by the digit-controlling wheels 42. Each of these wheels 52 carries a cam 53 for operating the next adjacent higher wheel once in each revolution to perform the operation of "carrying", as is well known in the addition of numbers, and when reversed, of subtraction. The cam shown in Fig. 2 is carried by the gear wheel 52 corresponding to the one shown broken away in such figure. Each cam is intended to operate an escapement lever 54, all of which levers are mounted on a cross rod 55. Each lever (see Fig. 17) has near one end a pin 56 for engagement therewith of the respective cam 53, and at its other end carries a spring-held laterally movable pawl 57, which pawls engage the respective wheel 41 of the several trains of gearing.

Figures 4, 5, 6, 7, 9:
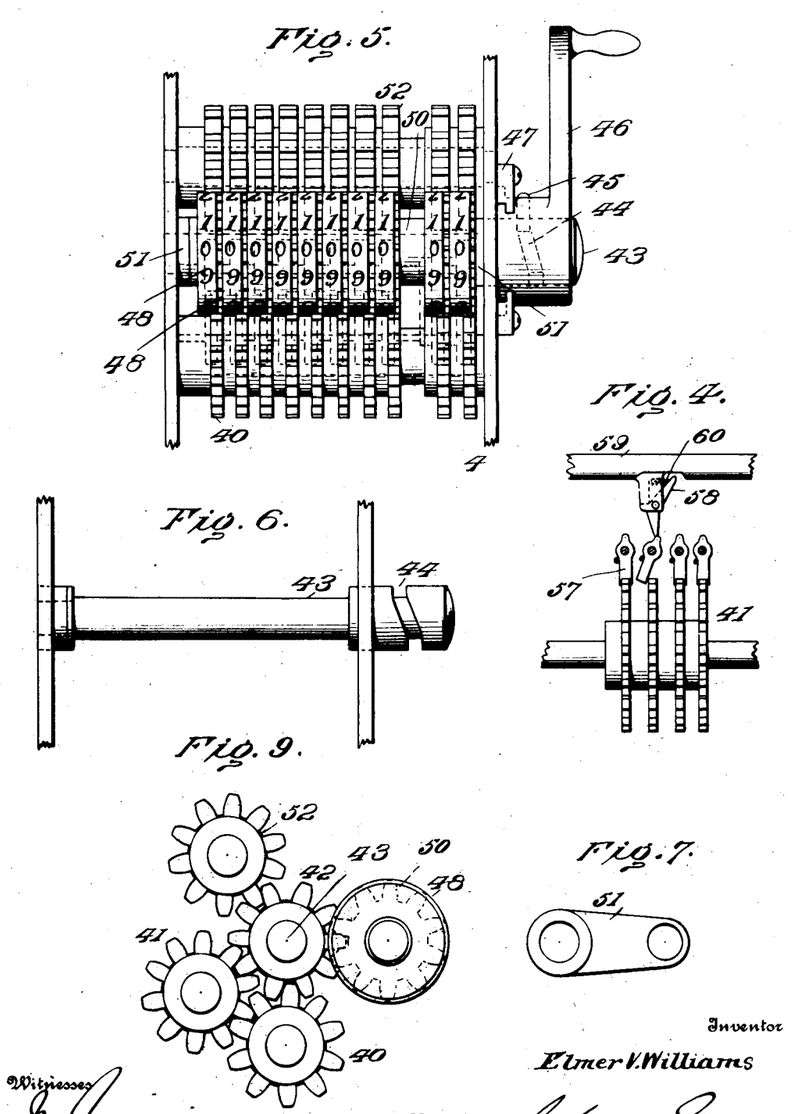
Fig. 4 is a view of some of the gear-wheels of the calculator, the escapement pawls and the tripping arm.
Fig. 5 is a detached view of the digit wheels and their shifting means.
Fig. 6 shows the shaft of the digit wheels.
Fig. 7 is a detail.
Fig. 9 is a side view of a portion of the gearing of the calculator.
Figure 8:
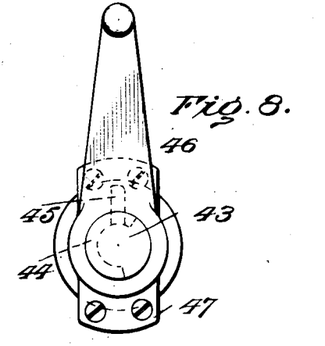
Fig. 8 is a face view of the digit shifting arm.
Figure 10:
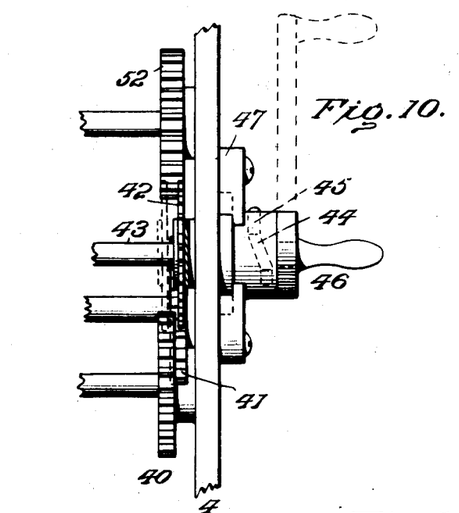
Fig. 10 is an edge view thereof.

To allow of the operation of any one train of gearing it is necessary that the respective pawl 57 be thrown out of engagement with its gear-wheel 41. In order that the pawl of the train of gearing with the wheel 40 of which the controller shaft gear 9 is in engagement may be released while such gear is in mesh with such wheel 40, I provide a trip in the form of spring-held pawl 58 extending from a fixed rod 59 extending from one end of the typewriter above and parallel with the controller shaft. This rod coincides with a transverse opening in the calculator casing, and the pawl 58 is in line with the outer short arms of pawls 57. As the calculator traveling with the typewriter carriage moves over or telescopes rod 59 and shaft 8, each of the escapement pawls 57 will successively be turned laterally out of engagement with its respective gear 41 as it engages with pawl 58, and coincident therewith gear 9 of shaft 8 will be in mesh with gear 40 of the train of gearing whose escapement pawl is so released, so that should a numeral key be depressed while any one of the escapement pawls is disengaged, the respective train of gearing will immediately be set in operation. This is true since the controller shaft is free to revolve instantly upon the disengagement of pawl 14, the extent of such revolution being governed by the number of teeth in the gear-wheel 28. The disengagement of any one of the escapement pawls 57, although it leaves the respective train of gearing free to be operated, has no other effect thereon if a numeral key be not depressed. By reference to Fig. 4 it will be seen that as the wheels 41 move with the calculator from right to left the several escapement pawls 57 are turned laterally. As the calculator is moved in the opposite direction, however, the tripping pawl 58 is turned on its pivot as against the tension of a spring 60. See Fig. 4.

So far as concerns the actuation of an adjacent train of gearing, upon the completion of revolution of any one digit wheel, it is manifest that upon the rocking of the respective escapement lever 54 by the actuating cam 53, the respective pawl 57 will be elevated out of engagement with wheel 41 to permit the train of which the latter forms a part to turn sufficiently to allow the digit wheel to present the next higher or lower number, according as the machine is set for addition or subtraction. Instantly the lever 55 is freed of the actuating cam 53 the train of gearing will be arrested by the return of pawl 57 to its normal position.

In Fig. 1 I have shown a general view of the attachment for the addition or subtraction of any number of vertical columns up to nine, the calculator being movable with the typewriter carriage and capable of adjustment relatively thereto, the point of attachment and manner of attachment varying with different makes of typewriters. As the typewriter carriage moves from right to left, the calculator is brought across, or caused to telescope, shaft 8 and rod 59 so that the tripping pawl 58 will engage the escapement pawls 57 and gear wheel 9 will engage the gears 40, or be in line therewith. The controller shaft controls the movement of the spring-actuated train of gearing, and it in turn is governed by the key action. The movement of each train of gearing is checked and controlled from two separate sources, first by the escapement pawl 57, and secondly by the controller wheel and shaft. In consequence, no movement of any one train of gearing is permitted by this double locking or controlling agency except that which it is intended to permit, and in order that the controller shaft and its wheel may assume control of any one train, the locking pawl thereof must be disengaged at the time the controller wheel is in mesh with the respective gear wheel 40. Hence the tripping pawl 58 is in the same vertical plane with the controller gear. It follows that any one train of gearing is free to operate only when its escapement pawl is released, and the controller shaft is free of its retaining pawl 14, which latter is dependent upon the key action.

The operation of the machine will be clearly understood from the following illustration of the addition of three sets of numbers of three figures each, say, 456, 567, and 678. The calculator is adjusted relatively to the type carriage so that the gear 40 of the units column will be in mesh with the controller shaft gear 9 when the pointer is at "60" on the guide scale. The hundreds column will therefore be at "58". With the pointer at "58", the operator depresses numeral key 4, thereby throwing the segmental toothed wheel 28 into mesh with its respective gear-wheel 29, allowing the controller shaft to revolve seven-tenths of its circumference, the pawl 14 being disengaged from wheel 10 by the depression of the type key. The controller wheel being in mesh with the gear-wheel 40 of the hundreds column, the hundreds digit wheel will be revolved, under the action of the spring motor, until the stop tooth 30 engages wheel 29, which in this case would be four-tenths of the circumference of the latter. The figure 4 would appear at the opening 49. The same action takes place when keys "5" and "6" are depressed, the number 456 appearing on the digit wheels in the hundreds, tens and units columns. The pointer being again placed at "58", (for a new line) the operator depresses type key "5". The operation is as before, the figure "9" appearing on the hundred digit wheel at the opening 49. Then the type key "6" is depressed, causing the respective digit wheel to make a complete revolution and one-tenth more. This latter fractional movement through cam 53 and lever 54 of the hundreds column allows the hundreds digit wheel to advance one-tenth, so that instead of "9" of the hundreds column appearing at opening 49, "0" or zero appears. As the several trains of gearing and escapements are identical, "carrying" will likewise take place between hundreds and thousands, and so on, and in consequence, simultaneously with the appearance of "0" in the hundreds column, "1" will appear in the thousands column. A similar action takes place when numeral key "7" is depressed; and also when a new line is taken and the final number 678 is written. When all of these numbers are printed one below the other, the sum total will appear at opening 49 on the circumferences of four digit wheels. Before the operator prints this sum total below the three sets of figures, he turns the crank 46 axially so as to shift the digit controlling wheels 42 out of engagement with gear wheels 40 and into engagement with wheels 41, in order that the digit wheels of the calculator may be returned to zero ready for further use. Thereupon, when the operator depresses type key "1" (the controller wheel being in mesh with wheel 40 of the thousands column and the pointer at "57" on the guide scale) 1000 is subtracted from the number written. The key "7" is then depressed and 700 is subtracted, "0" appearing on the digit wheel of the hundreds column. Type key "0" is then depressed, and not being geared with the calculator the latter is in no way affected, and hence "0" of the tens column remains as before. Finally type key "1" is depressed, and in consequence all the digit wheels of the calculator read zero.

Figure 13:
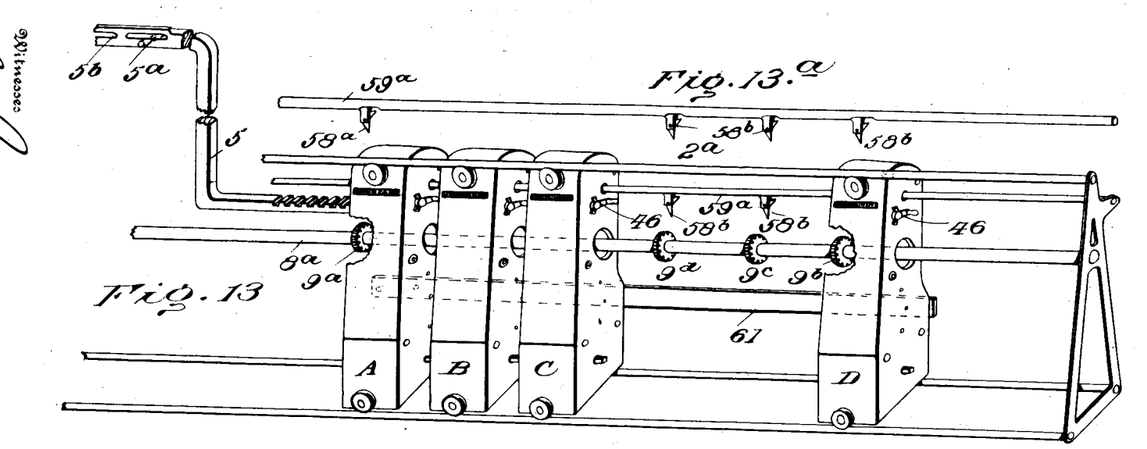
Fig. 13 shows in perspective the attachment as used for cross-work.

In Fig. 13 I have shown my invention as employed for cross addition or cross subtraction. This calls for the employment of a plurality of calculators and an increase in the number of gear-wheels on the controller shaft, which latter of course has to be lengthened, as has also the frame $2^a$ upon which the calculators travel back and forth with the movements of the typewriter carriage. In this figure I have shown three calculators A, B, and C, located in close relation to each other, and a gear wheel $9^a$ on the elongated controller shaft $8^a$, such gear wheel being designed to intermesh with gear wheels of the three calculators A, B, and C, corresponding to the gear-wheels 40, before described. I have also shown a fourth calculator D located some distance to the right of the three calculators and movable conjointly therewith, all being joined by a common bar 61. This fourth calculator is intended to move across any one of three smaller gear wheels $9^b$, $9^c$, or $9^d$ on controller shaft $8^a$. When any one of the gear wheels 40 of calculator A is in mesh with gear wheel $9^a$, similar gear-wheels of calculator D are in mesh with gear wheel $9^b$, while when calculator B is moved over gear wheel $9^a$, calculator D is over gear-wheel $9^c$. The same is also true with respect to calculator C and gear-wheel $9^a$ on the one hand, and calculator D and gear-wheel $9^d$, on the other hand. When calculator A is in operation under the control of gear-wheel $9^a$, the same result will appear on the digit wheels of the calculator D as is indicated by the digit wheels of calculator A; then as the carriage is moved to the left, and calculator B is brought into operative relation with controller wheel $9^a$ and calculator D into operative relation with gear-wheel $9^c$, the digit wheels of calculator D are reversed (if cross subtraction is being worked) by the shifting of such digit wheels in the manner hereinbefore recited. In consequence, the digit wheels of calculator D are reversed simultaneously with the operation of the digit wheels of calculator B. Hence the difference between the sums of the digit wheels of calculators A and B will be indicated by the digit wheels of calculator D. When this difference is printed by the typewriter, calculator C will be in operative relation with controller wheel 9ᵃ, and calculator D in operation with controller wheel 9ᵈ. The digit wheels of calculator D being still in subtraction will be returned to zero and the device ready for a new operation. By way of illustration it may be said that the sum indicated by calculator A would show the gross or minuend; that indicated by calculator B would show the tare or subtrahend; and that indicated by calculator C would show the net or remainder; while the digits of calculator D will be at zero. As far as this use of my invention is concerned, the only operation required on the part of the operator aside from the manipulation of the typewriter, is the setting of the digit wheels of calculator D for subtraction after the calculator A has performed its work.

Although the digit wheels of the calculator D, in cross subtraction, are returned to zero as the difference between the sums of the calculators A and B is being written (at which time the calculator is in operative relation with gear-wheel 9ᵃ) the calculations worked out by the three calculators A, B and C, respectively, are increased as each additional line of figures is written, so that the sums total of the calculators A, B and C, may be printed at the foot of each column. When this is being done the digit wheels of each of the three calculators are reversed for subtraction so that as the sums total are written they will be returned to zero. In this connection it will also be understood that in printing numbers that are not to be recorded by the calculators it is only necessary for the operator to throw the locking pawl 12 into engagement with wheel 10 of the controller shaft, thereby preventing the operation of the latter as the type keys are depressed.

An illustration of cross subtraction follows:

| Car No. | Gross. | Tare. | Net. |
|---|---|---|---|
| I. C. 66524 | 126470 | 24400 | 102070 |
| I. C. 67829 | 94320 | 21380 | 72940 |
| S. P. 79800 | 85630 | 24570 | 61060 |
| Total | 306420 | 70350 | 236070 |

The figures appearing in the first column under the heading "Car No." will not be recorded since calculator A has not yet been thrown into engagement with the controller shaft. In the printing of the numbers of the "Gross" column the pawl 12 is thrown back against stop 13, and before printing the numbers in the column "Tare" the digit wheels of the calculator D are shifted for subtraction, and are returned to zero as the remainder indicated thereby is being printed while calculator C is in operative relation with the controller shaft. The operation of writing the gross and tare in each column produces the net, and the writing of the several columns produces the total addition.

Although I have described the series of calculators as being employed for cross subtraction, it will be understood that in working cross addition the only difference in the operation lies in the fact that the digit-controlling wheels of calculator D remain in mesh with the respective gear wheels 40 until the sum of the cross addition is about to be registered by calculator C, whereupon calculator D is adjusted for subtraction, and then again adjusted for addition for a new line. In this arrangement the stationary rod 59ᵃ is equipped with an escapement tripping or releasing pawl 58ᵃ for each of the calculators A, B and C, and with three additional pawls 58ᵇ for calculator D, all of which are in vertical line with the respective gear wheels of the controller shaft.

Figure 14:
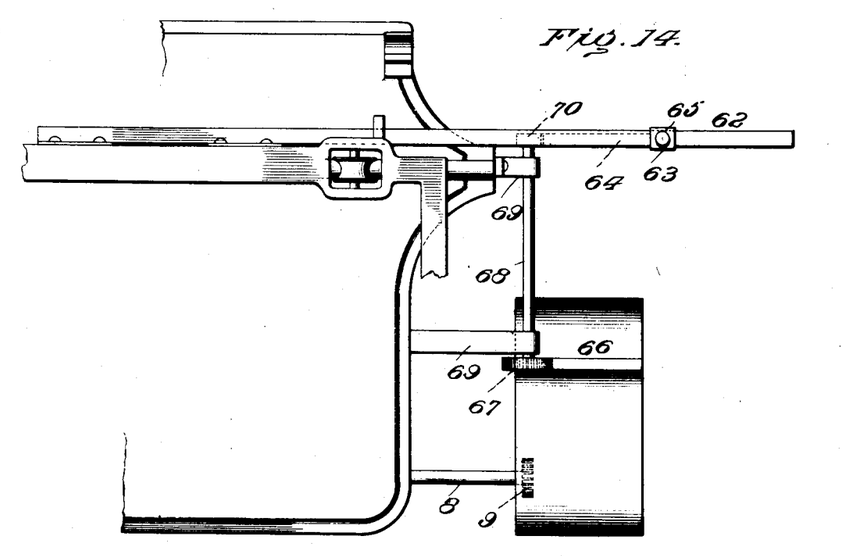
Fig. 14 is a plan view, Fig. 15 a front elevation and Fig. 16 an end view of a modified form of operating the calculator.
Figure 15:
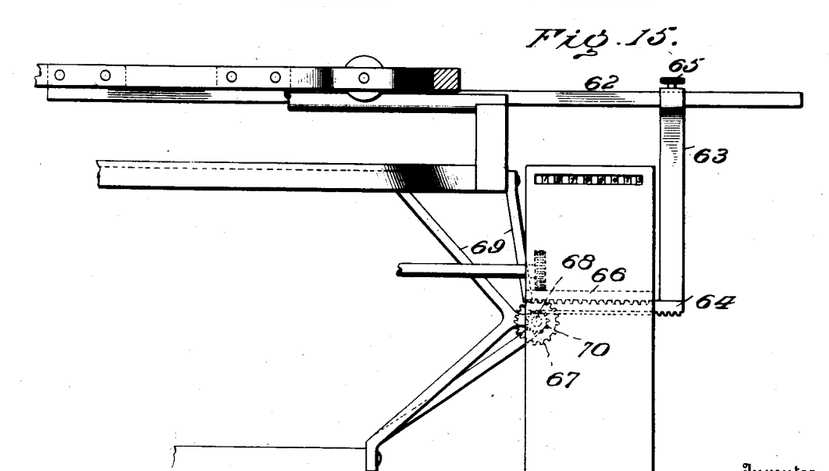
Figure 16:
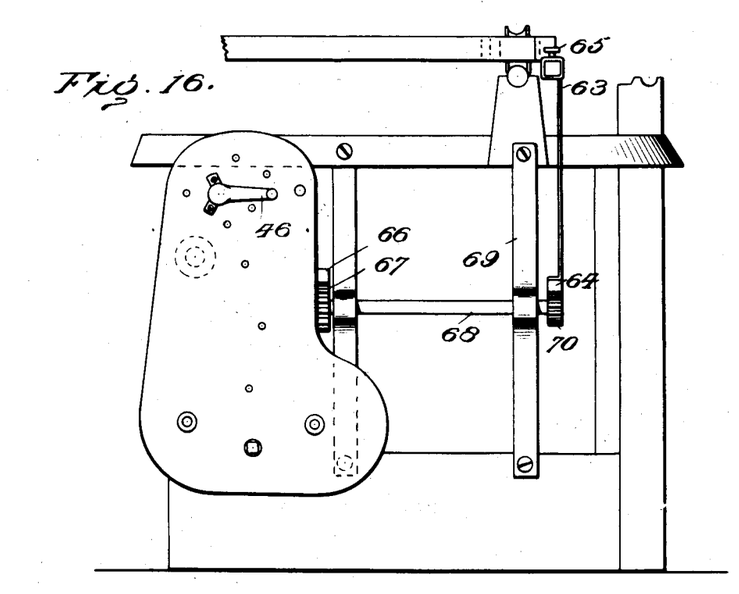

In lieu of having the calculator travel with the carriage continuously, it may be arranged to move only during a portion of such travel. Its motion relative to that of the carriage may also be twofold, so as to allow of greater space between the several trains of gearing of the calculator. All of this is shown in Figs. 14, 15 and 16. The bar 62 is straight and from it depends an arm 63 carrying a horizontally-disposed rack-bar 64, said arm being adjustable by a screw 65. The calculator has a rack-bar 66 with which meshes a gear-wheel 67 on a shaft 68 having its bearings in brackets 69. On the rear end of this shaft is a gear-wheel 70 of one-half the diameter of the gear-wheel 67. When wheel 70 is engaged and turned by the rack-bar 64, traveling with the carriage, the movement of such wheel will, through the larger wheel 67, impart a multiplying movement to the calculator. The gear-wheel 67 is always in mesh with the rack-bar of the calculator, but the smaller gear-wheel is engaged by the traveling rack-bar only at or about the time the calculator is to be set in operation.

The advantages of my invention are apparent to those skilled in the art. It is manifest that the same may be applied to various standard makes of typewriting machines, and that by means thereof the adding and subtraction of numbers may be quickly and accurately accomplished, either as regards vertical columns or sums horizontally arranged.

It is obvious that changes may be made in the details of construction without departing from the spirit or scope of my invention.

I claim as my invention:

1. The combination with a typewriting machine, having a traveling carriage, of a frame and a traveling calculator, actuating means for the calculator carried thereby, means for normally restraining such actuating means, means fixedly mounted relative to the frame of the typewriting machine for releasing such restraining means when the calculator is brought into proper relation thereto, and means actuated by depressing any numeral key of the typewriter for controlling the extent of operation of the calculator.

2. The combination with a typewriting machine, having a traveling carriage, of a frame and a traveling calculator, spring-impelled actuating means for the calculator, means for holding the calculator mechanism as against such actuating means, means having a fixed relation to the typewriter frame for releasing such holding means, means also having a fixed relation to the typewriter frame for coöperating with the calculator, and means actuated by any numeral key of the typewriter for permitting such latter means to coöperate with the calculator while the holding means is released.

3. The combination with a typewriting machine, having a frame and a traveling carriage, of a calculator movable with said carriage, spring-impelled actuating means for the calculator, means for holding the calculator mechanism as against such actuating means, means having a fixed relation to the typewriter frame for releasing such holding means, means also having fixed relation to the typewriter frame for coöperating with the calculator, means actuated by the numeral keys of the typewriter for permitting such latter means to coöperate with the calculator while the holding means is released, and means for limiting such coöperation, such latter means being different for each numeral key of the typewriter.

4. The combination with a typewriting machine having a frame and a traveling carriage, of a calculator, movable with said carriage, having several separate digit wheels and separate trains of actuating gearing for each digit wheel, escapement means normally restraining each train, means having fixed relation to the typewriter frame for releasing such escapement means, a controller shaft mounted on the typewriter having a gear-wheel in line with such releasing means, said gear-wheel being in sliding engagement with a corresponding gear-wheel of each train of gearing, means normally holding such controller shaft to prevent the rotation of any train of gearing whose escapement is released by said releasing means, and means actuated by the numeral keys of the typewriter for releasing the controller shaft holding means.

5. The combination with a typewriting machine having a frame and a traveling carriage, of a calculator, movable with said carriage, having several separate digit wheels and separate trains of actuating gearing for each digit wheel, escapement means normally restraining each train, means having fixed relation to the typewriter frame for releasing such escapement means, a controller shaft mounted on the typewriter having a gear wheel in line with such releasing means, said gear-wheel being in sliding engagement with a corresponding gear-wheel of each train of gearing, means normally holding such controller shaft to prevent the rotation of any train of gearing whose escapement is released by said releasing means, means actuated by the numeral keys of the typewriter for releasing the controller shaft holding means, and means also actuated by such keys for limiting the rotation of such controller shaft.

6. The combination with a typewriting machine having a traveling carriage, of a calculator having separate digit wheels and separate trains of actuating gearing for such digit wheels, means for shifting such digit wheels so they may be actuated by different gear-wheels of each train of gearing according as the calculator is set for addition or subtraction, controlling means for coöperating with each train of gearing, and means for releasing such controlling means by the actuation of any numeral key of the typewriter.

7. The combination with a typewriting machine having a traveling carriage, of a calculator, movable with said carriage, having several sets of digit wheels and separate trains of actuating gearing for such digit wheels, escapement means for normally restraining each train of gearing, means for releasing such escapement means, controlling means for engaging the same gearing whose escapement means is released, means for releasing such controlling means by the actuation of a numeral key of the typewriter, and means for shifting the digit wheels into engagement with different wheels of the train of gearing, according as the calculator is being worked for addition or subtraction.

8. The combination with a typewriting machine having a frame and a traveling carriage, of a calculator movable with said carriage, actuating means for the calculator carried thereby, means for normally restraining such actuating means, means fixedly mounted relative to the typewriting machine frame for releasing such restraining means, controlling means for coöperating with such calculator to permit the operation thereof when the restraining means is released, means for normally locking such controlling means, and means actuated by keys of the typewriter for releasing such locking means.

9. The combination with a typewriting machine having a traveling carriage, of a calculator, movable with said carriage, controlling means for coöperating with such calculator to permit the operation thereof, means for normally locking such controlling means, means actuated by the numeral keys of the typewriter for releasing such locking means, and auxiliary locking means for preventing the release of such controlling means to permit the numeral keys to be actuated without affecting the calculator.

10. The combination with a typewriting machine, of a plurality of calculators capable of being worked for addition or subtraction, controlling means common to all the calculators and in operative relation to two of them at the same time, such controlling means being operable in one direction only with respect to each calculator, and means for causing such two calculators to operate simultaneously upon the actuation of a numeral key of the typewriter.

11. The combination with a typewriting machine, of a plurality of calculators capable of being worked for addition or subtraction, controlling means common to all the calculators and in operative relation to two of them at the same time, such controlling means being operable in one direction only with respect to each calculator, and means for causing such two calculators to operate simultaneously upon the actuation of a numeral key of the typewriter, one such calculator indicating addition and the other subtraction.

12. The combination with a typewriting machine, of a plurality of calculators, a controller with which each calculator is designed to successively operatively engage, such controller being operable in one direction only with respect to each calculator, means normally locking said controller, means for releasing such locking means upon the actuation of a numeral key of the typewriter, and a separate calculator actuated simultaneously with each of the aforementioned calculators for indicating the sums total of their work.

13. The combination with a typewriting machine having a traveling carriage, of a plurality of calculators movable with such carriage, a controlling shaft having a gear-wheel with which each calculator is designed to successively operatively engage, such controlling shaft being operable in one direction only with respect to each calculator, means normally locking said shaft, means for releasing such locking means upon the actuation of a numeral key of the typewriter, and a separate calculator movable with said plurality of calculators and actuated simultaneously with each of them for indicating the sums total of their work, said controller shaft being common to said separate calculator and having gear-wheels with which the latter successively operatively engages as each of said plurality of calculators successively engages the first mentioned gear-wheel of the controller shaft.

14. The combination with a typewriting machine, of a series of three calculators, for working cross subtraction, the first for indicating the minuend, the second the subtrahend, and the third the remainder, a fourth calculator having shiftable digits for working both addition and subtraction, and means for simultaneously operating the fourth calculator and any one of the three calculators by the depression of any of the numeral keys of the typewriter, such means being movable in one direction only with respect to each calculator.

15. A calculator having means for mechanically registering sums of addition or subtraction, spring-actuated operating means therefor, and means for restraining such latter means, in combination with a typewriting machine, a controller for coöperating with said operating means, means actuated by the keys of the typewriter for releasing such controller and limiting the movement thereof, and means having a fixed relation to said controller for releasing said restraining means.

16. The combination with a typewriter, of a calculator movable in relation thereto and having a series of digit wheels, separate trains of spring-actuated gearing for such digit wheels, a series or escapement devices for such trains of gearing, a stationary rod having a tripping device for releasing such escapement devices as they are moved across the plane thereof, a controlling shaft having a gear wheel with which one wheel of each train of gearing is designed to be brought into engagement, such gear-wheel and tripping device being in the same vertical plane, means for normally holding said shaft, means for releasing such holding means as each numeral key of the typewriter is actuated, and means also actuated by the depression of such keys for arresting the rotation of such shaft.

17. The combination with a typewriter, of a calculator movable in relation thereto and having a series of digit wheels, separate trains of spring-actuated gearing for such digit wheels, a series of escapement devices for such trains of gearing, a stationary rod having a tripping device for releasing such escapement devices as they are moved across the plane thereof, a controlling shaft having a gear wheel with which one wheel of each train of gearing is designed to be brought into engagement, such gear-wheel and tripping device being in the same vertical plane, means for normally holding said shaft, means for releasing such holding means as each numeral key of the typewriter is actuated, a series of gear-wheels on such shaft, one for each numeral key of the typewriter, segmentally toothed wheels designed to engage said series of gear-wheels as said releasing means is actuated, and stops for limiting the rotation of said controlling shaft, the number of teeth of each segmentally toothed wheel corresponding to the respective numeral keys of the typewriter.

18. The combination with a typewriter having a movable carriage, and a calculator movable therewith, of the controlling shaft having a gear-wheel with which a gear wheel of said calculator is designed to have sliding engagement, means in the same vertical plane with such gear-wheel for releasing the calculator mechanism, a series of gear-wheels on said shaft, segmentally toothed wheels for engaging said gear-wheels, having each a stop tooth, spring-held supports for said toothed wheels, and means actuated by the several numeral keys for shifting said supports to throw said segmentally toothed wheels into engagement with their respective gear-wheels, said stop teeth limiting the rotation of said controller shaft.

19. The combination with a typewriter, of a calculator having a series of digit-controlling wheels, and a separate train of spring-actuated gearing for each digit-controlling wheel, such digit-controlling wheels being designed to engage either of two intermeshing wheels of each train of gearing, means for shifting such digit-controlling wheels, a controller shaft for coöperating with each train of gearing, means for releasing the train of gearing with which the controller shaft is in operative relation, and means actuated by the typewriter keys for freeing such controller shaft and regulating the revolution thereof.

20. In a calculator, the combination with the several trains of gearing, of the digit-controlling wheels, the longitudinally-movable shaft therefor having an eccentric groove in one end, a stationary lug projecting into such groove, and a crank arm on the end of such shaft.

21. In a calculator, the combination with the series of digit-controlling wheels, separate trains of spring-actuated gearing for such digit-controlling wheels, and an escapement for each train of gearing, of a series of wheels actuated by the digit-controlling wheels and having cams for engaging the escapements of the adjacent trains of gearing, each escapement having a laterally movable pawl for engaging and holding its respective train of gearing, means for moving such pawls independently of the escapements, and means for regulating the actuation of each train of gearing when the respective pawl thereof is released.

In testimony whereof, I have signed this specification in the presence of two subscribing witnesses.

ELMER V. WILLIAMS.

Witnesses:
BERNARD MYERS,
W. H. HYATT.